US011385123B2

(12) United States Patent
Yuan et al.

(10) Patent No.: US 11,385,123 B2
(45) Date of Patent: Jul. 12, 2022

(54) METHOD AND DEVICE FOR JUDGING GAS LEAKAGE, AND ELECTRONIC DEVICE (71) Applicants: HEFEI INSTITUTE FOR PUBLIC SAFETY RESEARCH, TSINGHUA UNIVERSITY, Anhui (CN); HEFEI ZEZHONG CITY INTELLIGENT TECHNOLOGY CO., LTD., Anhui (CN); OPERATION AND MONITORING CENTER FOR HEFEI URBAN SAFETY & SECURITY, Anhui (CN)

(72) Inventors: Hongyong Yuan, Anhui (CN); Ming Fu, Anhui (CN); Qiong Tan, Anhui (CN); Guofeng Su, Anhui (CN); Youping Zhu, Anhui (CN); Ningning Yan, Anhui (CN); Zewei Zhang, Anhui (CN)

(73) Assignees: Hefei Institute for Public Safety Research, Tsinghua University, Anhui (CN); Hefei Zezhong City Intelligent Technology Co., Ltd., Anhui (CN); Operation and Monitoring Center for Hefei Urban Safety & Security, Anhui (CN)

( * ) Notice: Subject to any disclaimer, the term of this patent is extended or adjusted under 35 U.S.C. 154(b) by 264 days.

(21) Appl. No.: 16/627,989

(22) PCT Filed: Dec. 20, 2018

(86) PCT No.: PCT/CN2018/122287
§ 371 (c)(1),
(2) Date: Dec. 31, 2019

(87) PCT Pub. No.: WO2020/052146
PCT Pub. Date: Mar. 19, 2020

(65) Prior Publication Data
US 2021/0293652 A1    Sep. 23, 2021

(30) Foreign Application Priority Data
Sep. 11, 2018    (CN) .......................... 201811058766.X (51) Int. Cl.
G01M 3/04    (2006.01)
G08B 21/16    (2006.01)

(52) U.S. Cl.
CPC .............. G01M 3/04 (2013.01); G08B 21/16 (2013.01)

(58) Field of Classification Search
CPC ................................ G01M 3/04; G08B 21/16
See application file for complete search history.

(56) References Cited

U.S. PATENT DOCUMENTS 6,668,619 B2 * 12/2003  Yang ...................... G01M 3/243
                                                  73/40.5 A
7,119,698 B2 * 10/2006  Schleich ............. G01M 3/2807
                                                  73/40

(Continued)

FOREIGN PATENT DOCUMENTS

CN    104776319 A    7/2015
CN    105572300 A    5/2016

(Continued)

OTHER PUBLICATIONS

International Search Report for PCT/CN21018/122287 dated May 31, 2019. (Chinese only).

Primary Examiner — David A. Rogers
(74) Attorney, Agent, or Firm — Martin & Ferraro, LLP (57) ABSTRACT

The present disclosure relates to a method and a device for judging gas leakage, and an electronic device. The method includes: acquiring methane concentration data collected by monitoring devices, and generating a first function corresponding to the methane concentration data; acquiring a change rule of methane concentration in an inspection well (Continued)

during biogas accumulation, and generating a second function of the methane concentration changing with time; calculating a first correlation coefficient between the first function and the second function, and judging whether the first correlation coefficient is greater than a first preset threshold; acquiring a third function of gas consumption changing with time if no; and calculating a second correlation coefficient between the first function and the third function, judging whether the second correlation coefficient is less than a second preset threshold, and judging whether the gas leakage occurs based on the methane concentration data if no.

13 Claims, 10 Drawing Sheets

(56) References Cited

U.S. PATENT DOCUMENTS

| | | | | |
|---|---|---|---|---|
| 8,079,245 B1* | 12/2011 | Owens | .................. | G01F 23/806 |
| | | | | 73/1.73 |
| 8,103,462 B2* | 1/2012 | Liu | .................. | F01M 11/12 |
| | | | | 702/50 |
| 8,343,679 B2* | 1/2013 | Bono | .................. | H01M 8/04955 |
| | | | | 429/444 |
| 9,395,262 B1* | 7/2016 | Kumar | .................. | G01M 3/2807 |
| 10,094,095 B2* | 10/2018 | Enev | .................. | G01M 3/2815 |
| 10,247,666 B2* | 4/2019 | Massie | .................. | G01N 21/314 |
| 10,386,258 B1* | 8/2019 | Steele | .................. | G01M 3/22 |
| 10,386,262 B2* | 8/2019 | Chaudhary | .................. | G01M 3/2815 |
| 10,545,089 B2* | 1/2020 | Massie | .................. | G01N 21/3504 |
| 10,948,471 B1* | 3/2021 | MacMullin | .................. | G01N 33/0075 |
| 2016/0252422 A1* | 9/2016 | Howitt | .................. | G01M 3/2807 |
| | | | | 73/40.5 A |
| 2017/0219454 A1* | 8/2017 | Chaudhary | .................. | G01M 3/2815 |
| 2018/0127957 A1* | 5/2018 | Enev | .................. | G01M 3/2815 |
| 2019/0257747 A1* | 8/2019 | Massie | .................. | G01N 21/314 |
| 2021/0232741 A1* | 7/2021 | Ogiso | .................. | G01M 3/002 |

FOREIGN PATENT DOCUMENTS

| | | |
|---|---|---|
| CN | 106052971 A | 10/2016 |
| CN | 107228282 A | 10/2017 |
| CN | 108119760 A | 6/2018 |
| JP | 2011099690 A | 5/2011 |
| JP | 5595711 B2 | 9/2014 |
| WO | WO2016058372 A1 | 4/2016 |

\* cited by examiner

METHOD AND DEVICE FOR JUDGING GAS LEAKAGE, AND ELECTRONIC DEVICE

CROSS-REFERENCE TO RELATED APPLICATION

The present disclosure is a U.S. National Phase application under 35 USC § 371 of International Application No. PCT/CN2018/122287, filed on Dec. 20, 2018 which is based on and claims priority to Chinese Patent Application No. 201811058766.X, filed on Sep. 11, 2018 all of which are incorporated herein by reference.

TECHNICAL FIELD

The present disclosure relates to a field of computer technology, in particular to a method and a device for judging gas leakage, and an electronic device.

BACKGROUND ART

With development of urbanization, density and operation time of urban underground gas pipeline networks are increasing, and the number and risk of gas pipeline leakage are also increasing.

SUMMARY OF THE INVENTION

Embodiments of the present disclosure provide a method for judging the gas leakage, including: acquiring methane concentration data collected by monitoring devices, and generating a first function corresponding to the methane concentration data, in which, the monitoring devices are distributed in adjacent underground spaces of a gas pipeline network; acquiring a change rule of the methane concentration in an inspection well during biogas accumulation, and generating a second function of the methane concentration changing with time; calculating a first correlation coefficient between the first function and the second function, and judging whether the first correlation coefficient is greater than a first preset threshold; acquiring a third function of gas consumption changing with time if the first correlation coefficient is less than the first preset threshold; calculating a second correlation coefficient between the first function and the third function, and judging whether the second correlation coefficient is less than a second preset threshold; and judging whether the leakage occurs based on the methane concentration data if the second correlation coefficient is greater than the second preset threshold.

Embodiments of the present disclosure provide an electronic device, including a processor, a memory and a computer program stored in the memory and executable by the processor. The processor is configured to perform the method for judging gas leakage according to the first aspect of embodiments.

Embodiments of the present disclosure provide a monitoring system, including one or more monitoring devices, a processing device, and an alert device. The one or more monitoring devices are distributed in adjacent underground spaces of a gas pipeline network, and configured to collect the methane concentration data. The processing device is configured to perform the method for judging gas leakage according to the first aspect of embodiments. The alert device is configured to issue an alert message if the gas leakage occurs. Embodiments of the present disclosure provide a non-transitory computer readable storage medium having a computer program stored thereon. When the computer program is executed by a processor, the method for judging gas leakage according to the first aspect of embodiments is implemented.

Additional aspects and advantages of the present disclosure will be given in part in following the description, and become apparent from the following descriptions, or be learned from the practice of the present disclosure.

BRIEF DESCRIPTION OF THE DRAWINGS

The accompanying drawings are used to provide a further understanding for the present disclosure and constitute a part of this specification. The accompanying drawings will be used to explain the present disclosure together with the following detailed implementations, but do not constitute a limitation on the present disclosure. In the drawings.

DETAILED DESCRIPTION

Reference will be made in detail below to embodiments of the present disclosure. Examples of embodiments are illustrated in the accompanying drawings, in which, the same or similar numbers represent the same or similar elements or elements with the same or similar functions. The embodiments described below by reference to the accompanying drawings are exemplary, which are intended to explain the present disclosure and are not to be construed as limiting the present disclosure.

At present, gas leakage detection mainly includes two modes, which are on-line gas monitoring for inspection wells and manual inspection along ground pipelines. The manual inspection is easy to be restricted by human physiological factors and affected by labor experience, and requires higher working skills for the inspection. Loopholes are easy to appear during the inspection, and other external factors may be restricted, such that the inspection effect is not ideal. Moreover, slight leakage of the gas pipeline may not be found in time. The effect of a non-line monitoring system is limited by cost of a detection equipment. The reason is that combustible gas in the inspection well is generated by decay of organic matter in the inspection well on one hand, and by gas leakage on the other hand. A main component of both the gases is methane. Therefore, the existing on-line monitoring system may not distinguish whether the gas pipeline leaks or the organic matter decays.

For this, the present disclosure aims to provide a method for judging gas leakage, which is used for judging whether a gas pipeline leaks by analyzing data information of gas in an inspection well, there by implementing timely discovery for gas pipeline leakage.

A method and a device for judging gas leakage, and an electronic device according to embodiments of the present disclosure will be described below with reference to the accompanying drawings.

Figure 1:
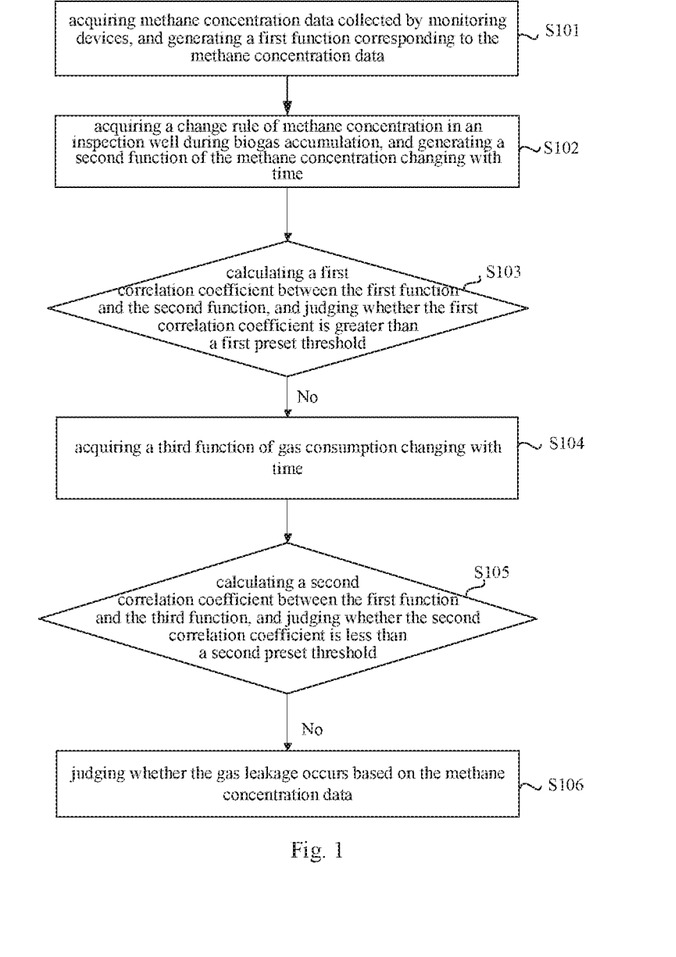
FIG. 1 is a flow chart of a method for judging gas leakage according to an embodiment of the present disclosure.

FIG. 1 is a flow chart of a method for judging gas leakage according to an embodiment of the present disclosure.

As illustrated in FIG. 1, the method for judging gas leakage includes the following.

At block S101, methane concentration data collected by monitoring devices is acquired, and a first function corresponding to the methane concentration data is generated.

The monitoring devices are distributed in adjacent underground spaces of a gas pipeline network.

In an embodiment of the present disclosure, the methane concentration data may be collected by the monitoring devices, thereby generating a corresponding first function based on the methane concentration data, i.e., a function of methane concentration changing with time.

At block S102, a change rule of the methane concentration in an inspection well during biogas accumulation is acquired, and a second function of the methane concentration changing with time is generated.

The second function of the methane concentration in the inspection well changing with time refers to a function of the biogas accumulation in the inspection well changing with time. The function is generated by historical measurement data.

At block S103, a first correlation coefficient between the first function and the second function is calculated, and it is judged whether the first correlation coefficient is greater than a first preset threshold.

After the first function and the second function are determined, a correlation between the two functions may be analyzed to obtain a first correlation coefficient $\varepsilon_1$ between the two functions, i.e., the correlation between a change rule of the methane concentration and the change rule of the methane concentration caused by bio gas in the inspection well. The value of the first correlation coefficient $\varepsilon_1$ approaches to 1, indicating that a linear correlation degree of the two functions is larger. $\varepsilon_1$ approaches to 0, indicating that the linear correlation of the two functions is smaller. The value $\varepsilon_1$ ranges from 0 to 1. In this embodiment, the first preset threshold is 0.9.

At block S104, a third function of gas consumption changing with time is further acquired if the first correlation coefficient is less than the first preset threshold.

Herein, the third function is a function of gas flow used by the user changing with time. For example, a morning peak and an evening peak of the gas consumption occur in each morning and evening. The morning peak usually occurs during 8:00-10:00 in the morning, and the evening peak usually occurs during 17:00-18:00 and 19:00-20:00 in the evening. A daytime trough occurs during 15:00-16:00 in the afternoon, and an evening trough occurs during 3:00-7:00 in the morning.

At block S105, a second correlation coefficient between the first function and the third function is calculated, and it is judged whether the second correlation coefficient is less than a second preset threshold.

After the third function is determined, a correlation between the first function and the third function may be analyzed to obtain a second correlation coefficient $\varepsilon_2$ between the first function and the third function, i.e., a correlation between the change rule of the methane concentration and the change rule of the gas consumption. The value of the second correlation coefficient $\varepsilon_2$ approaches to 1, indicating that a linear correlation degree of the two functions is larger. $\varepsilon_2$ approaches 0, indicating that the linear correlation between the two functions is smaller. The value of $\varepsilon_2$ ranges from 0 to 1. In this embodiment, the second preset threshold is 0.05.

It should be noted that, in embodiments of the present disclosure, both the first correlation coefficient and the second correlation coefficient are positive values. Since there may be a negative correlation between the first function and the second function and a negative correlation between the first function and the third function, that is, the correlation coefficient between the first function and the second function or the correlation coefficient between the first function and the third function may be less than 0. Therefore, in this embodiment, after the correlation coefficient between the first function and the second function is calculated, an absolute value of the correlation coefficient is taken as the first correlation coefficient. After the correlation coefficient between the first function and the third function is calculated, an absolute value of the correlation coefficient is taken as the second correlation coefficient.

At block S106, it is judged whether the gas leakage occurs based on the methane concentration data if the second correlation coefficient is greater than the second preset threshold.

In detail, a first time point corresponding to a maximum methane concentration value in the methane concentration data and a second time point corresponding to a minimum acquiring value in the methane concentration data may be obtained. Then it is judged whether the first time point and the second time point are within their respective preset time intervals. It is determined that the gas leakage occurs if the first time point and the second time point are within the irrespective preset time intervals. It is determined that the gas leakage does not occur if any of the first time point and the second time point is not within their respective preset time intervals for a preset number of consecutive days.

With the method for judging the gas leakage of embodiments of the present disclosure, the methane concentration data collected by the monitoring devices is acquired, the first function corresponding to the methane concentration data is generated, the change rule of the methane concentration in the inspection well during the biogas accumulation is acquired, the second function of the methane concentration changing with time is generated, the third function of the gas consumption changing with time is acquired, the correlation between the first function and the second function is analyzed, and the correlation between the first function and the third function is analyzed such that the accuracy of judging whether the gas leakage occurs may be improved, and the timely discovery for the gas pipeline leakage may be implemented.

Figure 2:
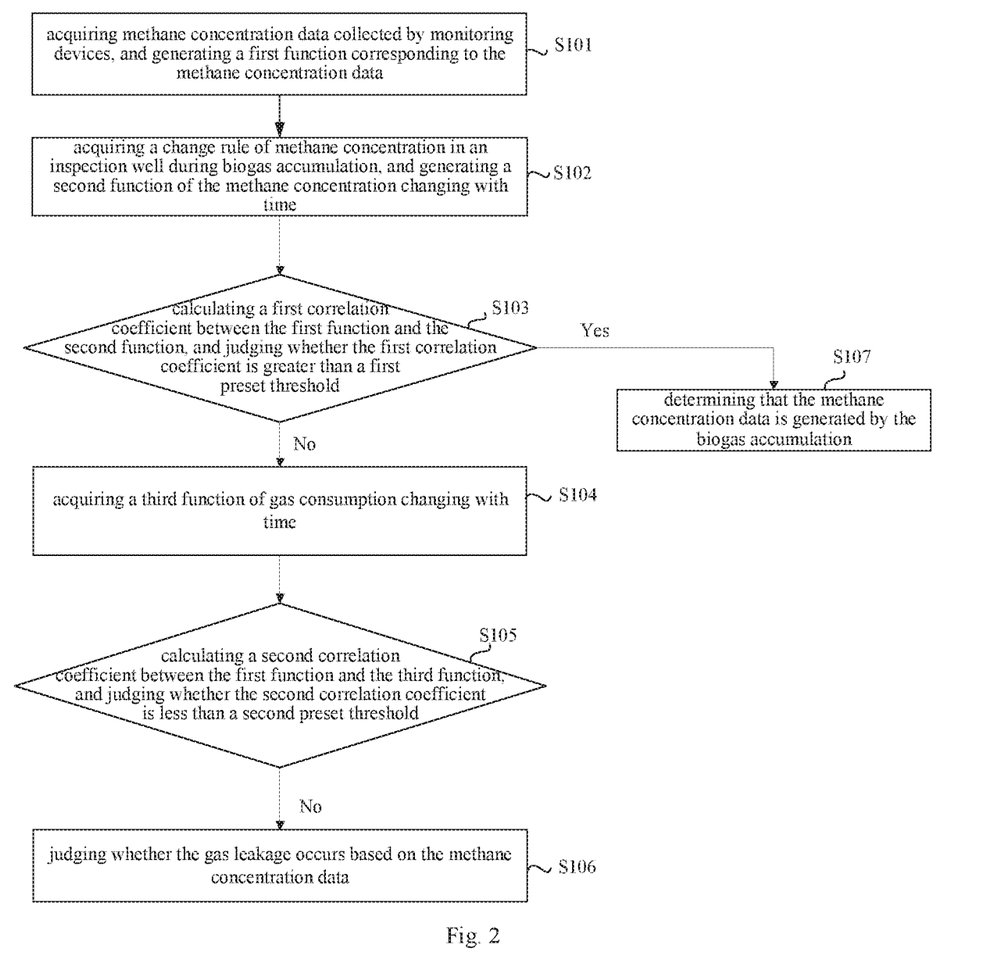
FIG. 2 is a flow chart of a method for judging gas leakage according to another embodiment of the present disclosure.

In another embodiment of the present disclosure, as illustrated in FIG. 2, the method for judging the gas leakage further includes the following.

At block S107, it is determined that the methane concentration data is generated by the biogas accumulation if the first correlation coefficient is greater than the first preset threshold.

Figure 3:
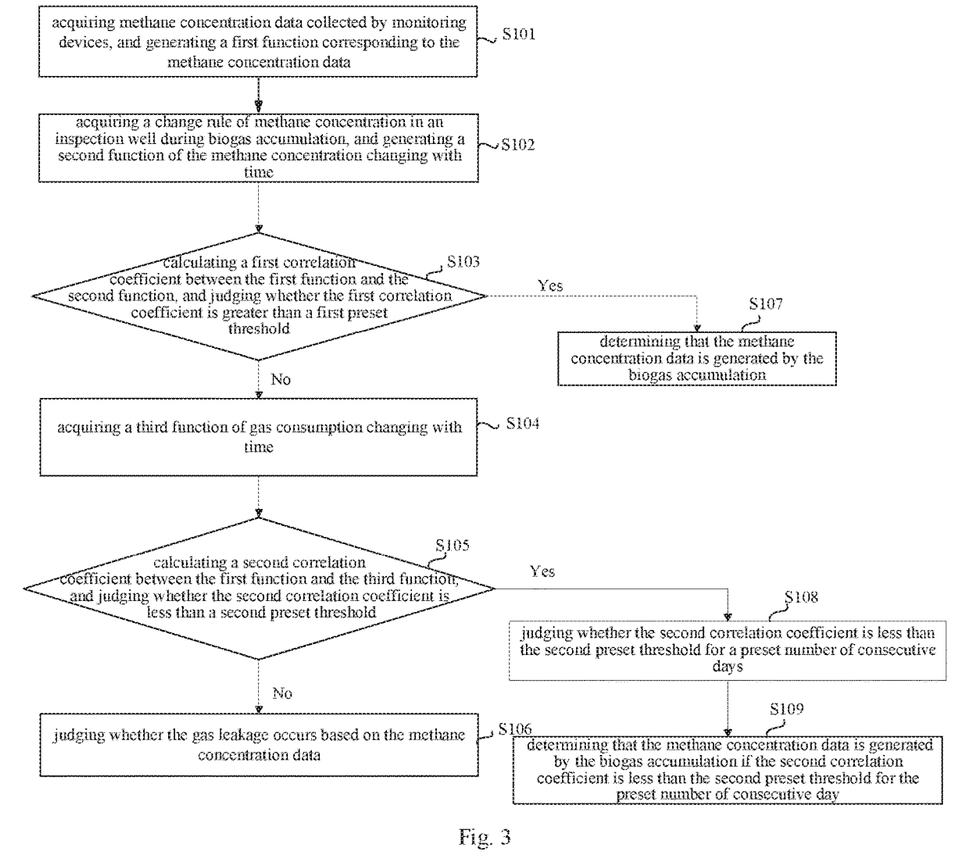
FIG. 3 is a flow chart of a method for judging gas leakage according to yet another embodiment of the present disclosure.

In yet another embodiment of the present disclosure, as illustrated in FIG. 3, the method for judging gas leakage further includes following.

At block S108, it is judged whether the second correlation coefficient is less than the second preset threshold for a preset number of consecutive days.

In this embodiment, a first function corresponding to methane concentration data may be obtained according to the methane concentration data in the inspection well monitored on the second day, and it is judged whether a first correlation coefficient between the first function and a second function is greater than the first threshold. If the first correlation coefficient is less than the first preset threshold, a second correlation coefficient between the first function and a third function is calculated, and it is judged whether the second correlation coefficient is less than the second preset threshold. If the second correlation coefficient is less than the second preset threshold, it is continuously judged whether the first correlation coefficient is greater than the first preset threshold according to the first correlation coefficient between the second function and the first function of the methane concentration data in the inspection well changing with time monitored in the next day. If the first correlation coefficient is less than the first preset threshold, it is judged whether the second correlation coefficient is less than the second preset threshold. If the second correlation coefficient is less than the second preset threshold, methane concentration data in the next day may be continuously acquired for judging.

At block S109, it is determined that the methane concentration data is generated by the biogas accumulation if the second correlation coefficient is less than the second preset threshold for the preset number of consecutive days.

It should be noted that, in this embodiment, it is determined that the methane concentration data is generated by the biogas accumulation when the first correlation coefficient is less than the first preset threshold and the second correlation coefficient is less than the second preset threshold every day in the preset number of consecutive days.

Figure 4:
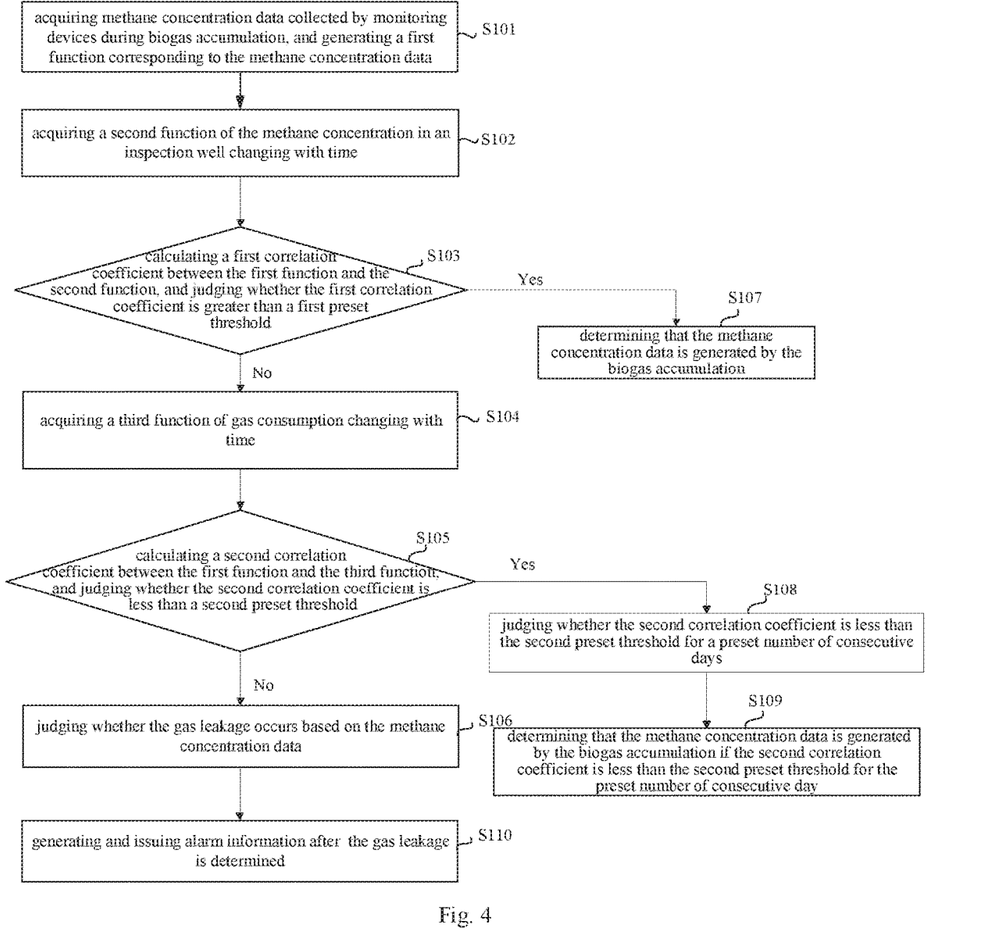
FIG. 4 is a flow chart of a method for judging gas leakage according to yet another embodiment of the present disclosure.

In yet another embodiment of the present disclosure, as illustrated in FIG. 4, the method for judging gas leakage further includes the following.

At block S110, an alarm message is generated and issued after the gas leakage is determined.

Description will be made below by a detailed example.

Firstly, monitoring devices for methane gas concentration are distributed in adjacent underground spaces of a gas pipeline network.

The number of point locations, alarm levels, methane concentration, collection frequency and uploading frequency of the monitoring devices for the methane gas concentration may be illustrated in Table 1.

TABLE 1

| Number of Point Locations | Alarm Levels | Methane Concentration | Collection Frequency | Uploading Frequency |
|---|---|---|---|---|
| 140 | Level 1 | 3% vol or more | 5 minutes | 5 minutes |
|  | Level 2 | 2% vol-3% vol | 10 minutes | 10 minutes |
|  | Level 3 | 1% vol-2% vol | 20 minutes | 20 minutes |
|  | No alarm | 1% vol or less | 30 minutes | 30 minutes |
| 100 | Level 1 | 3% vol or more | 5 minutes | 5 minutes |
|  | Level 2 | 2% vol-3% vol | 5 minutes | 5 minutes |
|  | Level 3 | 1% vol-2% vol | 5 minutes | 5 minutes |
|  | No alarm | 1% vol or less | 30 minutes | 6 hours |

Note: (1) The methane concentration at the alarm level 1 is 3% vol (included) and above; the methane concentration at the alarm level 2 is 2% vol (included) to 3% vol; and the methane concentration at the alarm level 3 is 1% vol (included) to 2% vol.

The monitoring devices for the methane gas concentration upload the collected data to a gas special monitoring system in a wired or wireless manner.

The gas special monitoring system analyzes the data after acquiring the above data.

In detail, the gas special monitoring system analyzes the change rule of the methane concentration changing with time, and generates a function X=f1(T). X represents a monitored methane concentration value, T represents a moment, and f1 represents a function of the monitored methane concentration value changing with time.

Then, the correlation between the change rule of the methane concentration and the change rule of methane concentration caused by the biogas is calculated, and the correlation coefficient $\varepsilon_1$ is calculated.

Figure 5:
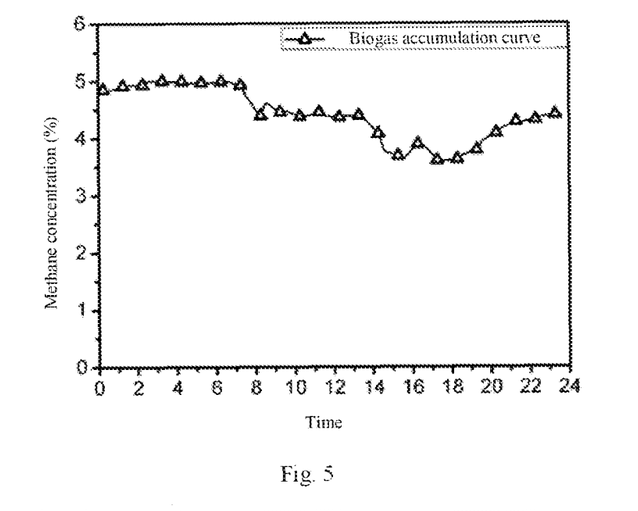
FIG. 5 is a curve chart illustrating biogas-caused alarms in the past 24 hours.

The function of the change rule of the methane concentration caused by the biogas is Z=f3(T). Z represents a biogas accumulation amount. T represents a moment, and f3 represents a function of the biogas accumulation amount changing with time. As illustrated in FIG. 5, FIG. 5 is a curve chart illustrating biogas-caused alarms in the past 24 hours.

Figure 6:
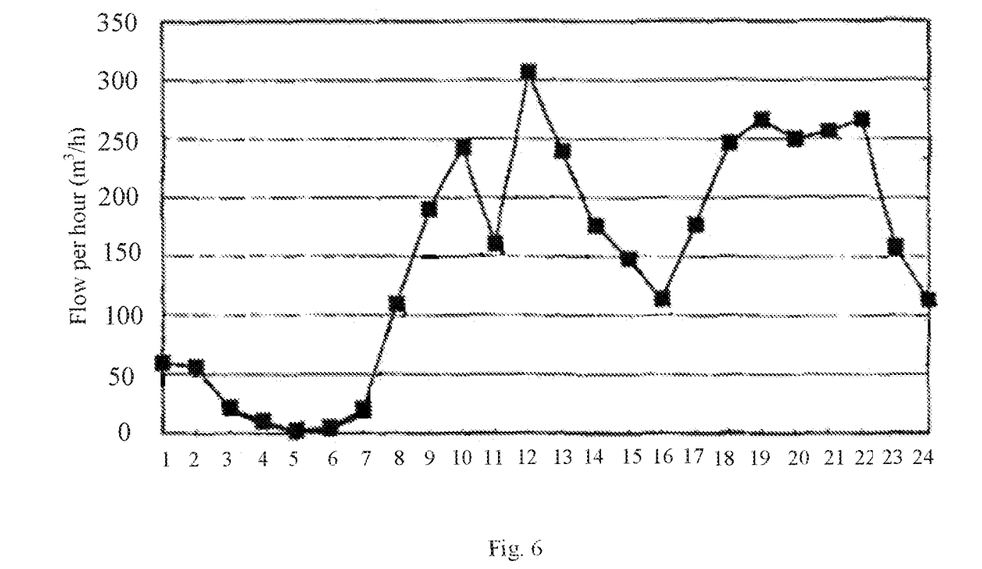
FIG. 6 is a curve chart illustrating gas consumption in the past 24 hours.

Afterwards, the change rule of gas consumption changing with time is analyzed to generate a function Q=f2(T). Q represents the gas consumption, T represents a moment, and f2 represents a function of the gas consumption changing with time. As illustrated in FIG. 6, FIG. 6 is a curve chart of gas consumption in the past 24 hours. A morning peak and an evening peak of the gas consumption occur in each morning and evening. The morning peak usually occurs during 8:00-10:00 in the morning, and the evening peak usually occurs during 17:00-18:00 and 19:00-20:00 in the evening. A day time trough occurs during 15:00-16:00 in the afternoon, and an evening trough occurs during 3:00-7:00 in the morning.

Next, the correlation between the change rule of the methane concentration and the change rule of the gas consumption changing with time is obtained by analyzing, and the correlation coefficient $\varepsilon_2$ is calculated.

Next, the reason for the change of the methane concentration may be judged based on $\varepsilon_1$ and $\varepsilon_2$.

It is judged whether $\varepsilon_1$ is greater than 0.9.

When $\varepsilon_1$ is greater than 0.9, it may be determined that the methane concentration data is generated by the biogas accumulation. In order to further improve the accuracy rate, multiple times of judgment may be performed. If judgment results of five consecutive times are that $\varepsilon_1$ is greater than 0.9, it is determined the methane concentration data is generated by the biogas accumulation.

When $\varepsilon_1$ is less than 0.9, it may be further judged whether 62 is less than 0.05.

When $\varepsilon_2$ is less than 0.05, multiple times of judgment may be performed. If judgment results of five consecutive times are that $\varepsilon_2$ is less than 0.05, it is determined that the methane concentration data is generated by the biogas accumulation.

When $\varepsilon_2$ is greater than 0.05, the judgment may further be performed.

A maximum value Xmax=max(Xi) of the methane concentration in the past 24 hours is acquired, and a time T=f(Xmax) at which the maximum value appears is recorded. Similarly, a minimum value Xmin=min(Xi) of the methane concentration in the past 24 hours is acquired, and the occurrence time T=f(Xmin) at which the minimum value appears is recorded.

A change rule of leakage gas concentration is closely related to a rule of the gas consumption. Therefore, it is judged firstly whether the time at which the maximum value Xmax appears is a time period with less gas consumption, that is, it is judged whether T=f(Xmax) is within 0:00 and 9:00. If so, it is further judged whether T=f(Xmin) is within a time period with more gas consumption, such as within 15:00 and 20:00. If so, it is determined that the gas leakage occurs and needs to be solved quickly. If T=f(Xmin) is not within 15:00 and 20:00, it is determined that the gas leakage does not occur.

In addition, if T=f(Xmax) is not within 0:00 and 9:00, it is further judged whether T=f(Xmin) is within 12:00 and 15:00. If T=f(Xmin) is not within 12:00 and 15:00, it is determined that the gas leakage does not occur. To further improve the accuracy, multiple times of judgment may be performed. For example, it is judged consecutively for five times that the gas leakage does not occur.

Figure 7:
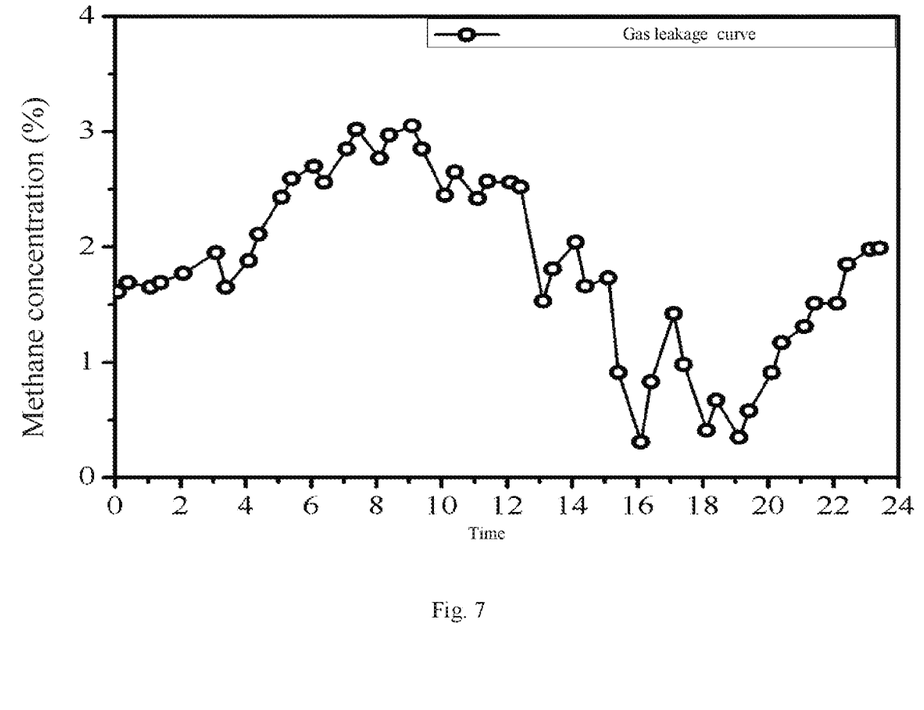
FIG. 7 is a curve chart illustrating gas leakage in the past 24 hours.

Unlike the alarm caused by the biogas, as illustrated in FIG. 7, when the gas leakage occurs, the methane concentration in the inspection well changes regularly with time, that is, a peak of a methane concentration curve in the inspection well mostly occurs during a time period early in the morning during which the gas consumption is less, and a valley mostly occurs during a time period in the evening during which the gas consumption is large.

Figure 8:
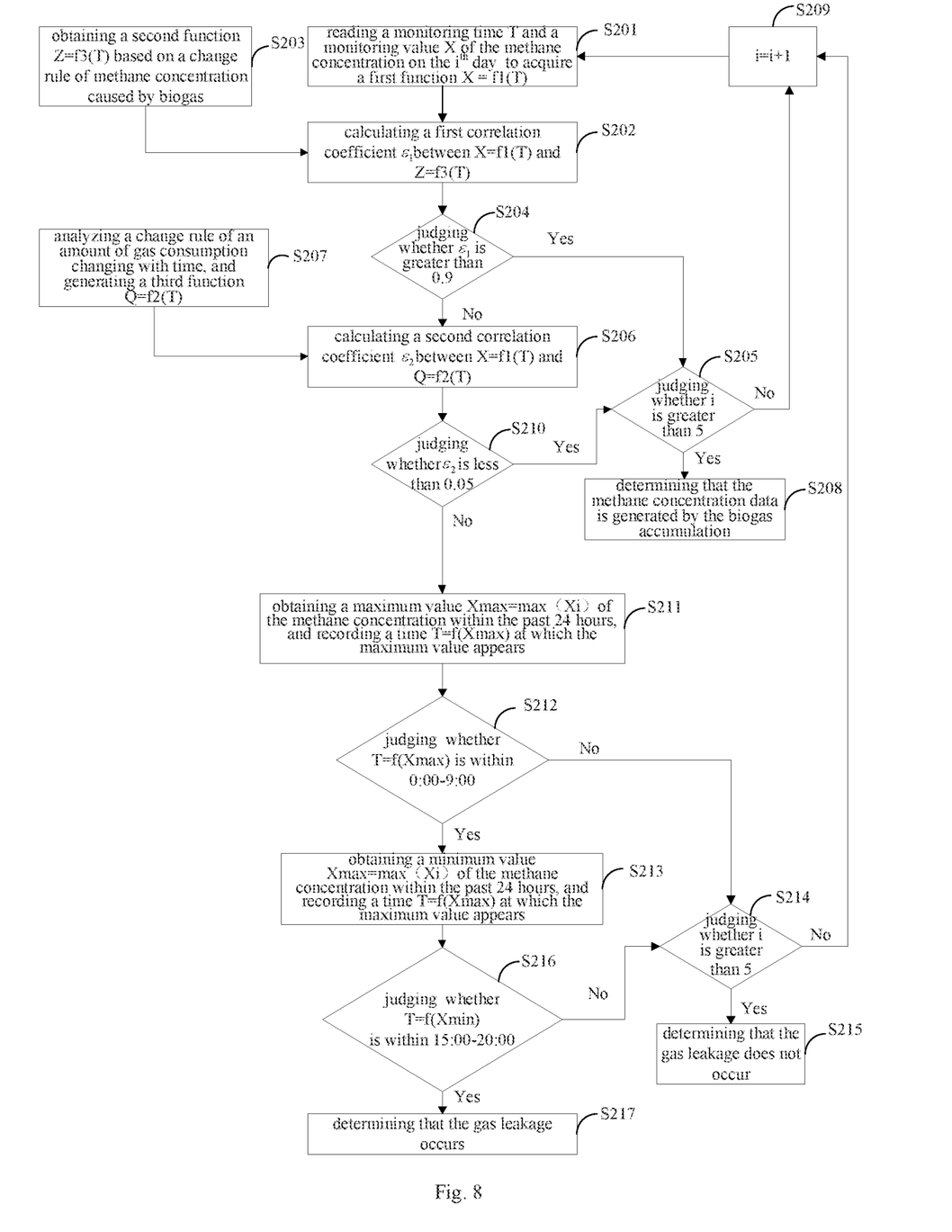
FIG. 8 is a flow chart illustrating a method for judging gas leakage according to a detailed embodiment of the present disclosure.

In the following, taking the preset number of consecutive days being five, the first preset threshold being 0.9 and the second preset threshold being 0.05 as an example, the method for judging the gas leakage of embodiments of the present disclosure is explained by a detailed embodiment. FIG. 8 is a flow chart illustrating a method for judging gas leakage according to a detailed embodiment of the present disclosure.

As illustrated in FIG. 8, the method for judging the gas leakage includes the following.

At block S201, a monitoring time T and a monitoring value X of the methane concentration on the $i^{th}$ day is read to acquire a first function X=f1(T).

i is a positive integer, and the monitoring data of the methane concentration on the first day may be read firstly for judgment.

At block S202, a first correlation coefficient $\varepsilon_1$ between X=f1(T) and Z=f3(T) is calculated.

In this embodiment, after the first function X=f1(T) corresponding to the $i^{th}$ day is acquired, the first correlation coefficient $\varepsilon_1$ between X=f1(T) and Z=f3(T) is calculated. Z=f3(T) is the second function acquired based on the change rule of the methane concentration caused by the biogas, i.e., the second function is acquired based on block S203.

At block S204, it is judged whether $\varepsilon^1$ is greater than 0.9. If so, block S205 is executed; otherwise, block S206 is executed.

At block S205, it is judged whether i is greater than 5. If i is greater than 5, block S208 is executed; otherwise, block S209 is executed.

In this embodiment, if the first correlation coefficient $\varepsilon_1$ is greater than 0.9, it is determined whether i is greater than 5. If i is greater than 5, indicating that the first correlation coefficient $\varepsilon_1$ is greater than 0.9 each day within 5 consecutive days after the first day, it is determined that the methane concentration data is generated by the biogas accumulation, that is, block S208 is executed.

If i is less than or equal to 5, block S209 is executed to add i by 1, and block S201 is executed to read monitoring data on the $(i+1)^{th}$ day and continues to judge by a first function obtained from the monitoring data.

At block S206, the second correlation coefficient $\varepsilon 2$ between X=f1(T) and Q=f2(T) is calculated.

In this embodiment, if the first correlation coefficient $\varepsilon_1$ is less than or equal to 0.9, the second correlation coefficient $\varepsilon_2$ between the first function X=f1(T) and the third function Q=f2(T) is calculated. The third function Q=f2(T) is acquired by analyzing the change rule of the gas consumption changing with time, that is, the third function is acquired by executing block S207.

At block S210, it is judged whether 62 is less than 0.05. If so, block S205 is executed; otherwise, block S211 is executed.

In this embodiment, the second correlation coefficient $\varepsilon_2$ is compared with 0.05. If the second correlation coefficient $\varepsilon^2$ is equal to or greater than 0.05, block S211 is executed to acquire a maximum value Xmax=max(Xi) of the methane concentration in the past 24 hours, i.e., within the $i^{th}$ day, and the time T=f(Xmax) at which the maximum value appears is recorded.

If the second correlation coefficient $\varepsilon_2$ is less than 0.05, block S205 is executed to judge whether i is greater than 5. If i is greater than 5, indicating that $\varepsilon_1$ of each day is greater than 0.9 and $\varepsilon^2$ of each day is less than 0.05 within five consecutive days after the first day, it may be determined that methane concentration data is generated by the biogas accumulation, that is, block S208 is executed; otherwise, block S209 is executed to add i by 1, the monitoring data on the $(i+1)^{th}$ day are acquired, and the judgment is performed continuously.

At block S211, the maximum value Xmax=max(Xi) of the methane concentration within the past 24 hours is acquired, and the time T=f(Xmax) at which the maximum value appears is recorded.

At block S212, it is judged whether T=f(Xmax) is within 0:00 and 9:00. If so, block S213 is executed; otherwise, block S214 is executed.

After T=f(Xmax) is acquired, it is judged whether the time at which the maximum value of the methane concentration occurs is within the valley period 0:00 and 9:00 of the gas consumption.

At block S213, the minimum value Xmin=min(Xi) of the methane concentration in the past 24 hours is acquired, and the time T=f(Xmin) at which the minimum value appears is recorded.

If T=f(Xmax) is within the valley period of the gas consumption, which is from 0:00 to 9:00, the time T=f(Xmin) at which the minimum value of the methane concentration appears in the past 24 hours, i.e., within the $i^{th}$ day, is acquired. Otherwise, block S214 is executed to judge whether i is greater than 5; if i is greater than 5, indicating that T=f(Xmax) of each day is not within the valley period of the gas consumption (which is from 0:00 to 9:00) within the 5 consecutive days after the first day, and it is determined that the gas leakage does not occur. If i is less than or equal to 5, block S209 is executed to add i by 1, the monitoring data on the (i+1)$^{th}$ day is acquired, and the judgment is performed continuously.

At block S216, it is judged whether T=f(Xmin) is within 15:00 and 20:00. If so, block S217 is executed; otherwise, block S214 is executed.

In this embodiment, after the time T=f(Xmin) at which the minimum value of the methane concentration appears in the past 24 hours, i.e., within the i$^{th}$ day, is acquired, it is judged whether T=f(Xmin) is within the peak period of the gas consumption, which is from 15:00 to 20:00. If so, block S217 is executed to determine that the gas leakage occurs. If not, it is judged whether is greater than 5. If i is greater than 5, indicating that the time at which the minimum value of the methane concentration appears each day within 5 consecutive days after the first day is not within the peak period of the gas consumption, it is determined that the gas leakage does not occur. If i is less than or equal to 5, block S209 is executed to add i by 1, the monitoring data of the methane concentration on the (i+1)$^{th}$ day is acquired, and the monitoring data on the (i+1)$^{th}$ day are used for continuously judging to improve the judgment accuracy.

With the present disclosure, the urban gas underground pipeline is comprehensively monitored in the above way, delay time for monitoring early warning is close to real time, the accuracy for positioning the leakage is less than 10 meters, the gas leakage may be discovered in time, a large amount of labor cost is saved, and accidents are prevented. It may be judged timely and effectively whether the alarm is caused by the biogas accumulation or by the gas leakage by performing statistical analysis and deep mining on the monitoring data, thereby improving the accuracy and timeliness and reducing the gas leakage. In order to implement the above embodiments, the present disclosure also provides a device for judging gas leakage.

Figure 9:
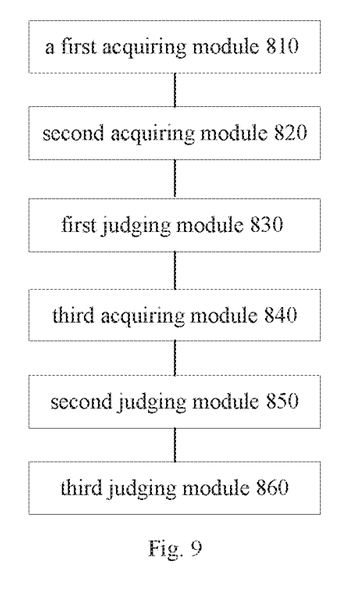
FIG. 9 is a block diagram of a device for judging gas leakage according to an embodiment of the present disclosure.

FIG. 9 is a block diagram of a device for judging gas leakage according to an embodiment of the present disclosure.

As illustrated in FIG. 9, the device for judging gas leakage includes a first acquiring module 810, a second acquiring module 820, a first judging module 830, a third acquiring module 840, a second judging module 850, and a third judging module 860.

The first acquiring module 810 is configured to acquire methane concentration data collected by monitoring devices, and to generate a first function corresponding to the methane concentration data. The monitoring devices are distributed in adjacent underground spaces of a gas pipeline network.

The second acquiring module 820 is configured to acquire a change rule of methane concentration in an inspection well during biogas accumulation, and to generate a second function of the methane concentration changing with time.

The first judging module 830 is configured to calculate a first correlation coefficient between the first function and the second function, and to judge whether the first correlation coefficient is greater than a first preset threshold.

The third acquiring module 840 is configured to further acquire a third function of gas consumption changing with time if the first correlation coefficient is less than the first preset threshold.

The second judging module 850 is configured to calculate a second correlation coefficient between the first function and the third function, and to judge whether the second correlation coefficient is less than a second preset threshold.

The third judging module 860 is configured to judge whether the gas leakage occurs based on the methane concentration data if the second correlation coefficient is greater than the second preset threshold.

Figure 10:
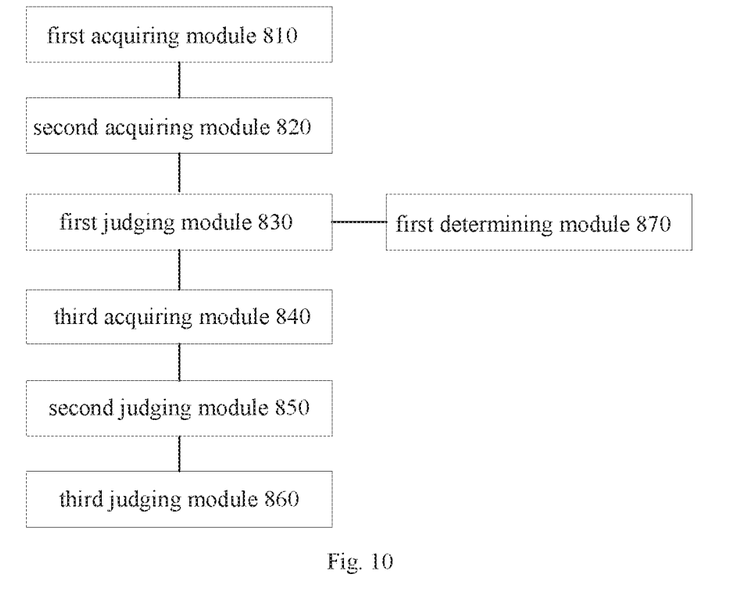
FIG. 10 is a block diagram of a device for judging gas leakage according to another embodiment of the present disclosure.

In another embodiment of the present disclosure, as illustrated in FIG. 10, the device for judging gas leakage further includes a first determining module 870.

The first determining module 870 is configured to determine that the methane concentration data is generated by biogas accumulation if the first correlation coefficient is greater than the first preset threshold.

Figure 11:
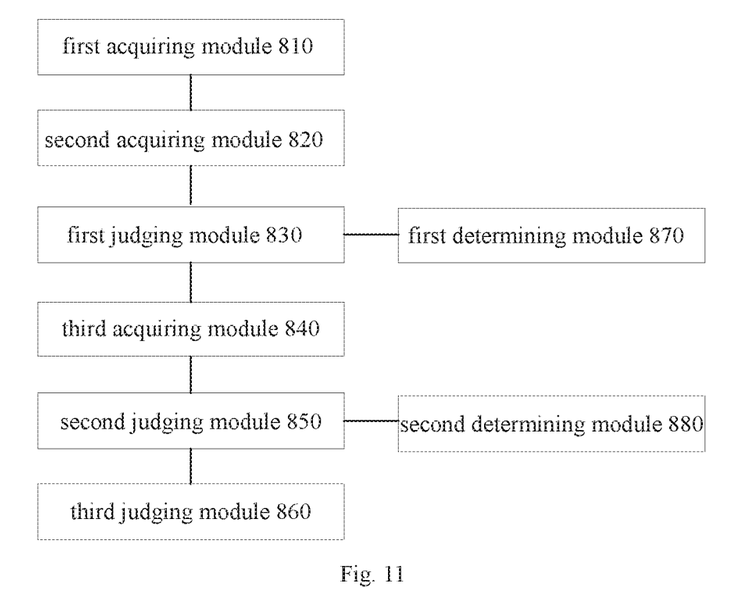
FIG. 11 is a block diagram of a device for judging gas leakage according to yet another embodiment of the present disclosure.

In yet another embodiment of the present disclosure, as illustrated in FIG. 11, the device for judging gas leakage further includes a second determining module 880.

The second determining module 880 is configured to determine that the methane concentration data is generated by the biogas accumulation if the second correlation coefficient is less than the second preset threshold for the preset number of consecutive days.

In yet another embodiment of the present disclosure, the third judging module 860 is configured to:

Acquire a first time point corresponding to a maximum value of the methane concentration in the methane concentration data and a second time point corresponding to a minimum value of the methane concentration in the methane concentration data:

Judge whether the first time point and the second time point are within the irrespective preset time intervals; and Determine that the gas leakage occurs if the first time point and the second time point are within their respective preset time intervals.

In yet another embodiment of the present disclosure, the third judging module 860 is further configured to:

Determine that the gas leakage does not occur if any of the first time point and the second time point is not within their respective preset time intervals for the preset number of consecutive days.

In yet another embodiment of the present disclosure, each of the first correlation coefficient and the second correlation coefficient ranges from 0 to 1, and the first preset threshold is greater than the second preset threshold.

Figure 12:
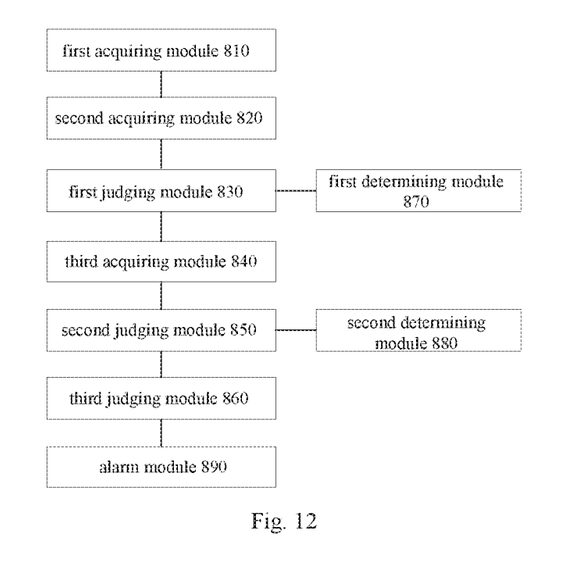
FIG. 12 is a block diagram of a device for judging gas leakage according to yet another embodiment of the present disclosure.

In yet another embodiment of the present disclosure, as illustrated in FIG. 12, the device for judging gas leakage further includes an alarm module 890.

The alarm module 890 is configured to generate and to issue an alarm message after the gas leakage is determined.

It should be noted that the foregoing explanation for the method for judging gas leakage is also applicable to the device for judging gas leakage of the embodiments of the present disclosure, and details not disclosed in the embodiments of the present disclosure will not be elaborated herein.

With the device for judging the gas leakage according to the embodiments of the present disclosure, the methane concentration data collected by the monitoring devices are acquired, and the first function corresponding to the methane concentration data is generated; then the change rule of the methane concentration in the inspection well during the biogas accumulation is acquired, the second function of the methane concentration changing with time is generated, and the third function of the gas consumption changing with time is acquired; and the correlation between the first function and the second function is analyzed, and the correlation between the first function and the third function is analyzed, thereby improving the accuracy for judging whether the gas leakage occurs, and implementing that the leakage of the gas pipe may be timely discovered.

Figure 13:
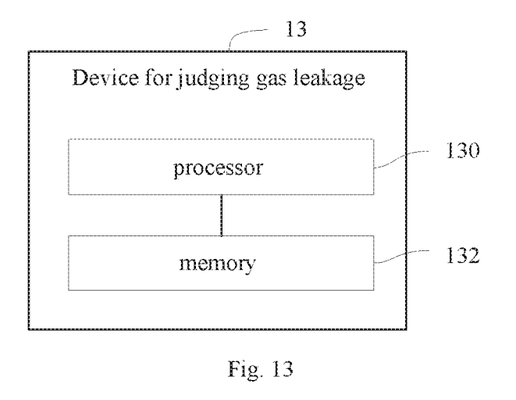
FIG. 13 is a block diagram of a device for judging gas leakage according to embodiments of the present disclosure.

FIG. 13 is a block diagram illustrating a device 13 for judging gas leakage according to embodiments of the present disclosure. The device 13 includes a processor 130 and a memory 132. The processor 130 is configured to perform the method for judging the gas leakage according to the above embodiments. The memory 132 includes a computer program executable by the processor.

Figure 14:
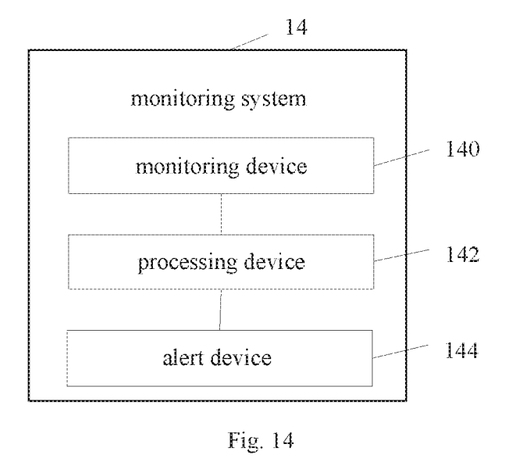
FIG. 14 is a block diagram of a monitoring system according to embodiments of the present disclosure.

FIG. 14 is a block diagram illustrating a monitoring system 14 according to embodiments of the present disclosure. The monitoring system 14 includes one or more monitoring devices 140, a processing device 142, and an alert device 144. The one or more monitoring devices 140 are distributed in adjacent underground spaces of a gas pipeline network, and configured to collect the methane concentration data. The processing device 142 is configured to perform the method for judging the gas leakage according to the above embodiments. The alert device 144 is configured to issue an alert message if the gas leakage occurs.

In order to implement the above embodiments, the present disclosure also provides an electronic device, including a processor, a memory, and a computer program stored in the memory and executable by the processor. The processor is configured to perform the method for judging the gas leakage according to the above embodiments.

In order to implement the above embodiments, the present disclosure also provides a non-transitory computer readable storage medium having a computer program stored thereon. When the computer program is executed by a processor, the method for judging the gas leakage according to the above embodiments is implemented.

In the description of this specification, the description for the terms "an embodiment", "some embodiments", "examples", "specific examples", or "some examples", etc., means that a particular feature, structure, material, or characteristic described in connection with the embodiment or example is included in at least one embodiment or example of the present disclosure. The appearances of the above terms throughout this specification are not necessarily referring to the same embodiment or example. Furthermore, the particular features, structures, materials, or characteristics described may be combined in any appropriate manner in one or more embodiments or examples. In addition, without a contradiction, the different embodiments or examples and the features of the different embodiments or examples can be combined by those skilled in the art in the specification.

In addition, terms such as "first" and "second" are used for purposes of description and are not intended to indicate or imply relative importance or implicitly indicate the number of indicated technical features. Thus, the features defined with "first" and "second" may include at least one such feature explicitly or implicitly. In the description of the present disclosure, "a plurality of" means at least two, e.g., two, three, etc., unless specifically specified otherwise.

Any procedure or method described in the flow charts or described in any other way herein may be understood to include one or more modules, portions or parts for executing instruction codes that implement steps of a custom logic function or procedure. And the preferable embodiments of the present disclosure includes other implementations, in which the order of execution is different from that which is depicted or discussed, including performing functions in a substantially simultaneous manner or in an opposite order according to the related functions, which may be understood by the skilled in the art of the embodiments of the present disclosure.

The logic and/or step described in other manners herein or shown in the flowchart, for example, a particular sequence table of executable instructions for realizing t logical function, may be specifically achieved in any computer readable medium to be used by an instruction execution system, a device, or an equipment (e.g., a system based on computers, a system including processors, or other systems capable of obtaining the instructions from the instruction execution system, device, or equipment and executing the instruction), or to be used in combination with the instruction execution system, device, or equipment. As to this specification, the "computer readable medium" can be any device adaptive for including, storing, communicating, propagating, or transferring program to be used by or in connection with the instruction execution system, device, or equipment. More specific examples (a non-exhaustive list) of the computer readable medium include: an electrical connection (electronic device) with one or more wires, a portable computer enclosure (magnetic device), a random access memory (RAM), a read only memory (ROM), an erasable programmable read-only memory (EPROM or Flash memory), an optical fiber device, and a portable compact disc read-only memory (CDROM). In addition, the computer readable medium may even be paper or other appropriate medium capable of printing programs thereon, that is because, for example, the paper or other appropriate medium may be optically scanned and then edited, decrypted or processed with other appropriate methods when necessary, and then the programs may be stored in the computer memories.

It should be understood that each part of the present disclosure may be implemented in hardware, software, firmware, or a combination thereof. In the above embodiments, a plurality of steps or methods may be implemented by software or firmware stored in memory and executed by the appropriate instruction execution system. For example, if it is realized by hardware, likewise in another embodiment, it may be realized by one or a combination of the following techniques known in the art: a discrete logic circuit having a logic gate circuit for realizing a logic function of a data signal, an application-specific integrated circuits having an appropriate combination logic gate circuit, a programmable gate array (PGA), a field programmable gate array (FPGA), etc.

The skilled in the art will understand that all or a part of the steps carried by the method of the above embodiments may be completed by a program indicating the related hardware. The programs may be stored in the computer readable storage medium. The program includes one of the embodiments of the method or the combination thereof when being executed.

In addition, each functional unit in the various embodiments of the present disclosure may be integrated in one processing module, each unit may exist physically alone, or two or more units may be integrated in one unit. The forgoing integrated units can be realized in the form of hardware or as a software functional module. If the integrated module is implemented as the software functional module and is sold or used as a stand-alone product, it may also be stored in a computer readable storage medium.

The storage medium mentioned above may be a read only memory, a disk, a disc, or the like. Although embodiments of the present disclosure have been shown and described above, it should be understood that the above embodiments are exemplary and cannot be understood to limit the present disclosure. The skilled in the art may make changes, modifications, replacements and variations in the above embodiments within scope of the present disclosure.

What is claimed is:

1. A method for judging gas leakage of a gas pipeline network performed by a gas monitoring system, the method comprising:
   acquiring methane concentration data collected by monitoring devices, and generating a first function representing a change rule of the collected methane concentration data with time, wherein the monitoring devices are distributed in adjacent underground spaces of the gas pipeline network;
   acquiring a change rule of methane concentration in an inspection well during biogas accumulation, and generating a second function of the methane concentration changing with time;
   calculating a first correlation coefficient between the first function and the second function, and judging whether the first correlation coefficient is greater than a first preset threshold;
   acquiring a third function of gas consumption changing with time if the first correlation coefficient is less than the first preset threshold;
   calculating a second correlation coefficient between the first function and the third function, and judging whether the second correlation coefficient is less than a second preset threshold; and
   if the second correlation coefficient is greater than the second preset threshold, determining that the gas leakage occurs in response to a first time point corresponding to a maximum methane concentration being within a first preset time interval and a second time point corresponding to a minimum methane concentration being within a second preset time interval.

2. The method of claim 1, further comprising:
   determining that the methane concentration data is generated by the biogas accumulation if the first correlation coefficient is greater than the first preset threshold.

3. The method of claim 1, further comprising:
   calculating the second correlation coefficient for a preset number of consecutive days, and determining that the methane concentration data is generated by the biogas accumulation if the second correlation coefficient is less than the second preset threshold for the preset number of consecutive days.

4. The method of claim 1, further comprising:
   determining that the gas leakage does not occur if the first time point is not within the first preset time interval or if the second time point is not within the second preset time interval for the preset number of consecutive days or if the first time point is not within the first preset time interval and the second time point is not within the second preset time interval for the preset number of consecutive days.

5. The method of claim 1, wherein each of the first correlation coefficient and the second correlation coefficient ranges from 0 and 1, and the first preset threshold is greater than the second preset threshold.

6. The method of claim 1, after determining that the gas leakage occurs, further comprising:
   generating and issuing an alarm message.

7. A device for judging gas leakage in a gas pipeline network, the device comprising:
   a processor;
   a memory, comprising a non-transitory computer readable storage medium; and
   a computer program, stored in the memory and executable by the processor;
   wherein the processor executes the computer program to:
      acquire methane concentration data collected by monitoring devices, and to generate a first function representing a change rule of the collected methane concentration data with time, wherein the monitoring devices are distributed in adjacent underground spaces of the gas pipeline network;
      acquire a change rule of methane concentration in an inspection well during biogas accumulation, and to generate a second function of the methane concentration changing with time;
      calculate a first correlation coefficient between the first function and the second function, and to judge whether the first correlation coefficient is greater than a first preset threshold;
      acquire a third function of gas consumption changing with time if the first correlation coefficient is less than the first preset threshold;
      calculate a second correlation coefficient between the first function and the third function, and to judge whether the second correlation coefficient is less than a second preset threshold; and
      if the second correlation coefficient is greater than the second preset threshold, determining that the gas leakage occurs in response to a first time point corresponding to a maximum methane concentration being within a first preset time interval and a second time point corresponding to a minimum methane concentration being within a second preset time interval.

8. The device of claim 7, wherein the processor is further configured to:
   determine that the methane concentration data is generated by biogas accumulation if the first correlation coefficient is greater than the first preset threshold.

9. The device of claim 7, wherein the processor is further configured to:
   determine that the methane concentration data is generated by the biogas accumulation if the second correlation coefficient is less than the second preset threshold for a preset number of consecutive days.

10. The device of claim 7, wherein the processor is further configured to:
    determine that the gas leakage does not occur if the first time point is not within the first preset time interval or if the second time point is not within the second preset time interval for the preset number of consecutive days or if the first time point is not within the first preset time interval and the second time point is not within the second preset time interval for the preset number of consecutive days.

11. The device of claim 8, wherein each of the first correlation coefficient and the second correlation coefficient ranges from 0 to 1, and the first preset threshold is greater than the second preset threshold.

12. The device of claim 7, wherein the processor is further configured to:
    generate and issue an alarm message after the gas leakage is determined.

13. A monitoring system for a gas pipeline network, the system comprising:
    one or more monitoring devices, distributed in adjacent underground spaces of the gas pipeline network, and configured to collect methane concentration data;
    a processing device and a non-transitory computer readable storage medium having a computer program stored thereon and executable by the processing device, the processing device executing the computer program to:

acquire the methane concentration data, and to generate a first function representing a change rule of the collected methane concentration data with time, wherein the monitoring devices are distributed in adjacent underground spaces of the gas pipeline network;

acquire a change rule of methane concentration in an inspection well during biogas accumulation, and to generate a second function of the methane concentration changing with time;

calculate a first correlation coefficient between the first function and the second function, and to judge whether the first correlation coefficient is greater than a first preset threshold;

acquire a third function of gas consumption changing with time if the first correlation coefficient is less than the first preset threshold;

calculate a second correlation coefficient between the first function and the third function, and to judge whether the second correlation coefficient is less than a second preset threshold; and if the second correlation coefficient is greater than the second preset threshold, determine that the gas leakage occurs in response to a first time point corresponding to a maximum methane concentration being within a first preset time interval and a second time point corresponding to a minimum methane concentration being within a second preset time interval; and an alert device, configured to issue an alert message if the gas leakage occurs.

* * * * *